Dec. 19, 1933.     S. C. AMOSS     1,940,160
EDGE TRIMMER
Filed Sept. 19, 1931     2 Sheets-Sheet 1

Inventor
S. C. Amoss
By Mason Fenwick & Lawrence
Attorneys

Dec. 19, 1933.  S. C. AMOSS  1,940,160
EDGE TRIMMER
Filed Sept. 19, 1931   2 Sheets-Sheet 2

Inventor
S. C. Amoss
By Mason Fenwick Lawrence
Attorneys

Patented Dec. 19, 1933

1,940,160

UNITED STATES PATENT OFFICE 1,940,160

EDGE TRIMMER

Samuel C. Amoss, Baltimore, Md., assignor of one-fourth to William A. McLeran, Baltimore, Md.

Application September 19, 1931
Serial No. 563,877

4 Claims. (Cl. 56—263)

This invention relates to grass cutters, and has for its general object the provision of an edge trimmer particularly adapted to cut around objects such as grave stones, copings or the like, with such absolute closeness as not to leave a single blade upstanding against the stone.

One of the more specific objects of the invention is to provide apparatus of the class described in which no part of the machine extends widthwise beyond the limits of the cutter unit so that the end of the cutting unit can be brought into contact with the stone, and the end teeth of the cutting unit having their apices in the planes of the sides of the cutting unit, whereby when the grass cutter is pushed along the base of a stone with the end of the cutting unit in contact therewith the grass which stands adjacent the stone and even the blades of grass which may be against the stone are deflected into the path of the reciprocating knives.

Another object of the invention is to provide cutting mechanism, including knives and a guard plate, which can be detached as a unit from the grass cutter for purpose of easy replacement.

A further object of the invention is to provide a free coupling between the operating mechanism and the knife bar so that the latter, together with the guard plate when removed as a unit, becomes automatically detached from the operating mechanism.

Still another object of the invention is to provide a carriage including a motor and cutting unit support, and comprising also a housing for the power transmission mechanism which shall serve at the same time as an outboard bearing for the motor.

Other objects of the invention will appear as the following description of a preferred and practical embodiment thereof proceeds.

In the drawings which accompany and form a part of the specification and in which the same reference characters have been used throughout the several figures to designate identical parts:

Figure 5:
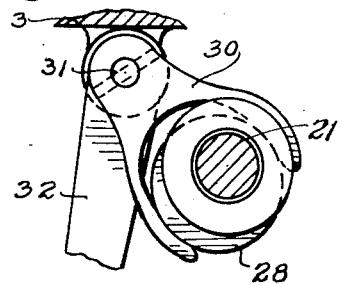
Figure 5 is a detail partly in section showing the cam connection between the motor and bell crank.

Referring now in detail to the several figures, the numeral 1 represents the carriage which comprises the wheels or rollers 2 and the frame 3. Said frame comprises a plate preferably bent at right angles as shown providing a mounting for the motor 4 and a support 5 for the cutting unit 6. Since the motor is probably the heavier part of the apparatus, a third wheel or caster, (not shown) may be provided to form a triangular wheel base and also an operating handle (not shown). The apparatus is designed to be pushed over the lawn adjacent the grave stones or other upstanding objects for the purpose of trimming the lawn close to the same.

The motor shaft 7 projects through a suitable aperture in the frame 3 and has its outer end supported by a bearing 8 carried in a housing or cover 9 suitably secured to the frame 3. An intermediate portion of the motor shaft is provided with a worm 10 meshing with a gear 11, by which means power is transmitted to the knife elements of the cutting unit.

Figure 1:
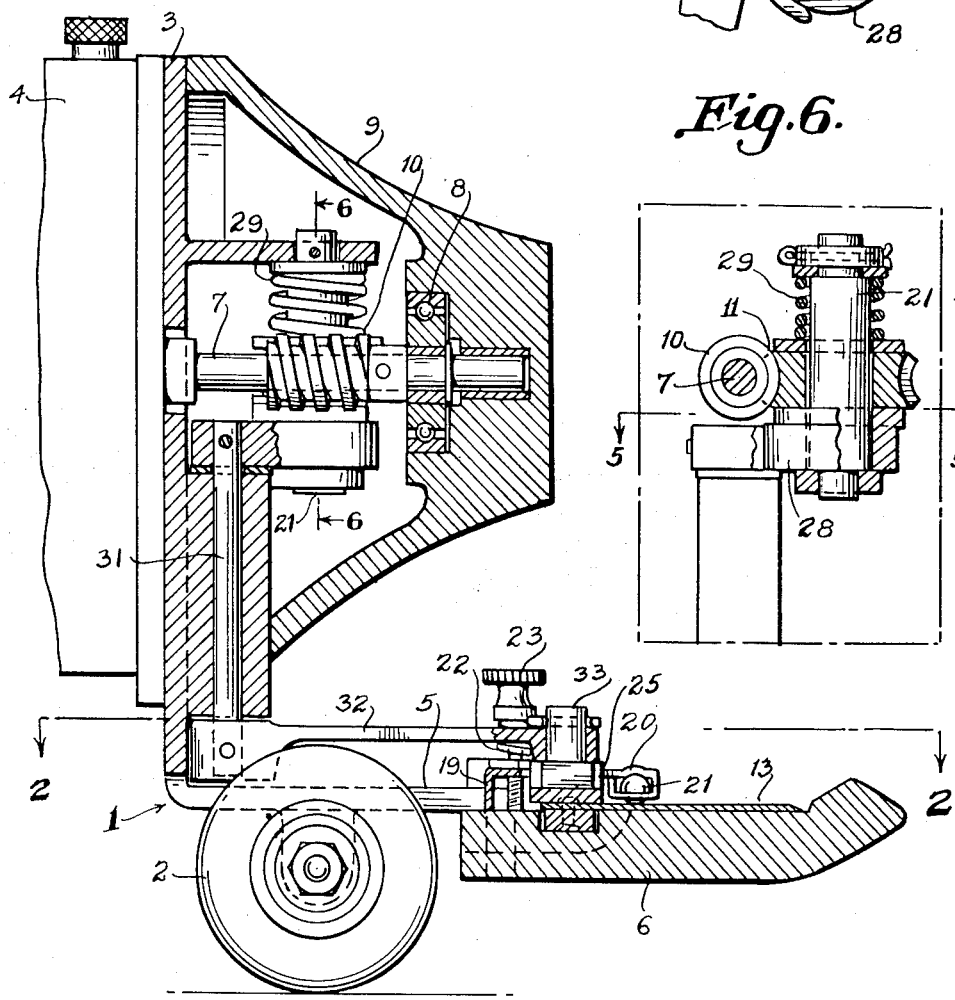
Figure 1 is a vertical section through the grass cutter, parts irrelevant to the invention being omitted.
Figure 2:
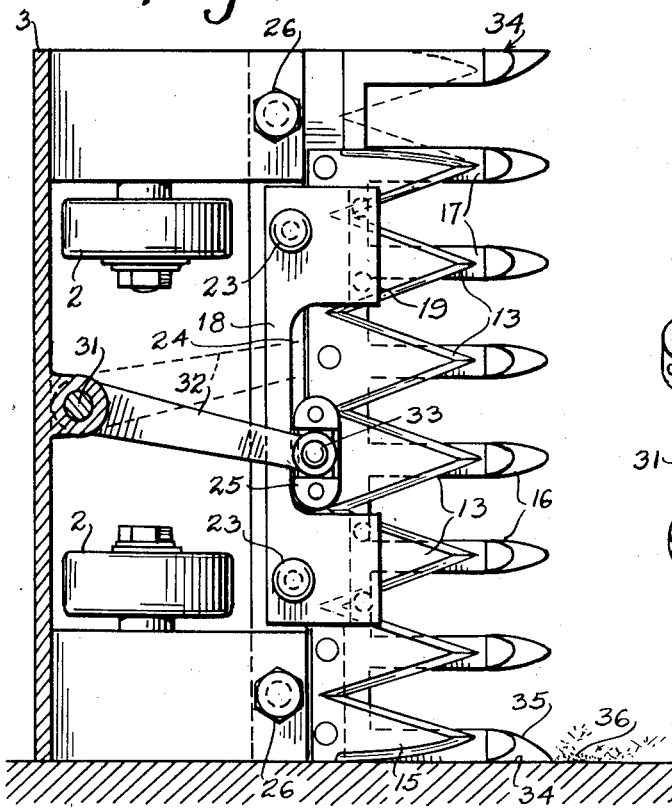
Figure 2 is a plan view of the cutting unit, a part of the support and the operating mechanism also being shown.
Figure 4:
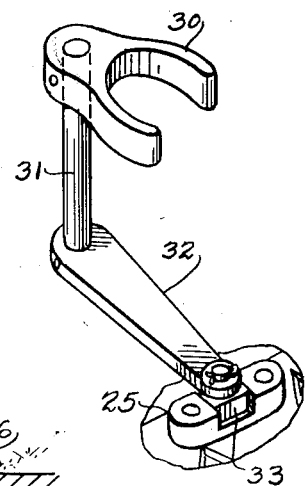
Figure 4 is a perspective view of the bell crank connection between the motor and reciprocatory knife bar for converting the rotary motion of the motor into the oscillatory movement of the knife bar.
Figure 3:
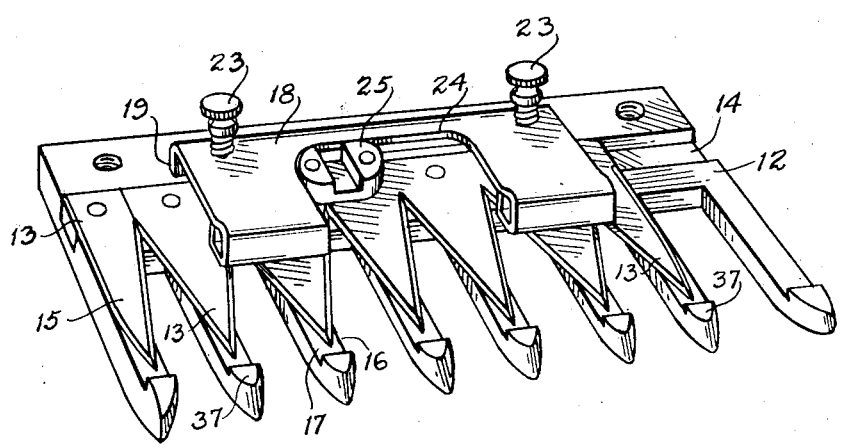
Figure 3 is a perspective view of the cutting unit.

Figures 2 and 3 show that the cutting unit follows the general principle of construction of a field mower, having a guard plate 12 and a reciprocatory knife bar 13. The knife bar preferably slides in a guideway 14 and has knives 15 and 16 riveted thereto in the usual manner. The knives are in general, of triangular shape forming a serrated cutting edge which traverses the parallel edges 16 of the teeth 17 formed on the guard plate, cooperating with said teeth to produce a shearing cut. The knife bar together with its attached knives is preferably retained in place solely by a tensioning plate 18 having a back flange 19 resting upon the guard plate and a front flange 19 overlying the knives. The front flange is preferably constructed so as to form a ball retainer in a manner indicated at 20 in Figure 1, the balls 21 pressing against the knives with a tension created by the spring 22 and which may be adjustably varied by means of the thumb screws 23, the shank of which the spring 22 surrounds and which is retained between the plate 18 and a shoulder on said thumb screw.

Figure 6:
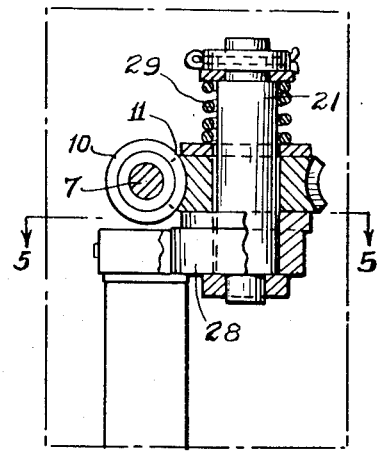
Figure 6 is a section taken along the line 6—6 of Figure 1.
Figure 7:
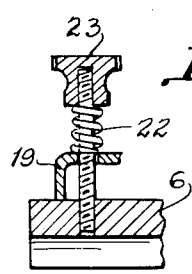
Figure 7 is a detail showing the adjusting means for the tensioning mechanism.

The retainer plate is preferably cut away as is indicated at 24 in Figure 3 so as to provide sufficient space for the range of movement for the block 25 fixed to the knife bar and affording a free coupling with an element of the power transmission. The knife bar is held in place solely through the agency of the tensioning plate 18 and the screws 23 and by removal of these screws the retainer plate and knife bar may be lifted from the guard plate. The unit comprising the guard plate, knife bar and tensioning mechanism is secured to the support 5 by the screw bolts 26. By loosening these bolts, the entire unit as depicted in Figure 3 may be removed, the free coupling afforded by the block 25 and the operating element, yet to be described, which engages it offers no impediment to the immediate displacement of the cutting unit. Figure 6 shows clutch mechanism comprising a shaft 27 to the lower end of which an eccentric cam 28 is secured. The shaft 27 is not positively connected, but merely frictionally engaged with the gear 11, the latter freely surrounding the shaft 27 and resting upon a shoulder on the upper end of the cam 28. A spring 29 is held in compression between the gear 11 by suitable means at the top of the shaft 27. Normally, the friction engendered between the shoulders on the cam 29 and on the gear 11 is sufficient to cause the gear 11 to rotate the shaft 27 and with it the cam 28. Said cam is compressed by the bifurcated end 30 of bell crank 31, the lower arm 32 of which has a pivotal slide 33 working freely in a slot formed in the block 25. When the gear 11 rotates through the power of the motor, the cam 28 causes the bell crank to oscillate imparting reciprocatory movement to the knife bar. Since the movement of the arm 32 is arcuate while that of the knife bar is rectilinear the necessity for the slide 33 in the slot in the block 25 is obvious. It is also apparent that when the unit shown in Figure 3 is removed, the slide 33 is automatically displaced from the block 25.

Should the free movement of the knife bar be resisted by a foreign obstruction, the cam 28 will slip relative to the gear 11 avoiding blowing out of the motor fuse or damage to the parts.

Figure 2 shows that the guard plate is formed with rectilinear parallel ends, and that the knife bar may extend to the ends, but in no case does it overlap the ends. This assures that the grass cutter may be pushed along the face of a grave stone or coping with an end of the guard plate against said stone. The end teeth 34 have their inner edges 35 converging outwardly and intersecting the ends of the guard plate so that the apices of said teeth lie in the planes of said ends. Each of the teeth thus forms a deflector for pushing a close lying grass blade such as that indicated in cross section at 36 in Figure 2, away from the surface of the stone and into the path of the reciprocating knives. The knives which cooperate with the outermost teeth of the guard plate have both cutting edges converging toward the apex of said knives so that the outer edges of said teeth, thus perform a progressive shearing cut upon the blades of grass which have been deflected by said teeth into the paths of the knives.

When the knife bar is in one of its extreme positions, the apex of the end knife in said extreme position lies intermediate the planes of the sides of the adjacent end guard tooth. The straight side of this guard tooth is absolutely necessary for effecting a close cut, for it is impracticable to make the outer edge of the knife straight and parallel to the end of the machine, since it would not be inclined to the inner edge of the end guard tooth and therefore would not perform a shearing cut.

The teeth of the guard plate have elevated ends 37 acting as shields to protect the points of the knives. This is a feature common to mowing machines, but it of course prevents the apparatus from being pushed forwardly into such close proximity to the grave stone to permit of a close cutting such as the present invention contemplates.

By the present invention the grass cutter is positioned with its end against the stone performing an absolutely close cut which obviates the need of trimming by hand, a drawback which characterizes the use of other machines.

While I have in the above described what I believe to be a preferred and practical embodiment of my device, it is to be understood that such changes in the construction and arrangement of parts may be resorted to as the exigencies in the use may teach or required, without transcending the spirit and scope of the invention as claimed.

What I claim is:

1. Edge trimmer comprising a guard plate having teeth, and a knife bar slidably mounted with respect thereto, having knives operable in shearing relation to said teeth, the ends of said guard plate constituting the over-all width limits of said edge trimmer, and the range of reciprocatory movement of said knife bar being within said limits, the apices of the end teeth terminating in the planes of the ends of said guard plate and the end knives each having edges on both sides converging to an apex which lies between the planes of the sides of the end tooth above which said knife lies when the knife bar is in extreme position.

2. Edge trimmer comprising a guard plate having teeth, and a knife bar slidably mounted with respect thereto, having knives operable in shearing relation to said teeth, the ends of said guard plate lying in planes perpendicular to the direction of reciprocation of said knife bar and constituting the over-all width limits of said edge trimmer, and the range of reciprocation of said knife bar being within said limits, the apices of the end teeth terminating in the planes of the ends of said guard plate and the end knives each having edges on both sides converging to an apex which lies between the planes of the sides of the end tooth above which said knife lies when the knife bar is in extreme position.

3. Edge trimmer comprising an angular frame comprising a substantially vertical portion constituting a mount for a motor, and a substantially horizontal portion affording a support for cutting mechanism, said cutting mechanism including a guard plate and a cooperating knife bar, said cutting mechanism being removable from said support as a unit, and a driving connection between said motor and cutting mechanism including an oscillatable shaft mounted in said frame, a yoke element adjacent one end of said shaft adapted freely to embrace a cam driven by the motor, and a coupling member adjacent the opposite end of said shaft, freely interdigitating with a complementary member on said knife bar, including a freely separable coupling between said cutting mechanism and said driving connection.

4. Edge trimmer comprising an angular frame having a substantially vertical portion constituting a mount for a motor, and a substantially horizontal portion functioning as a support for cutting mechanism, said cutting mechanism comprising a guard plate having teeth, a knife bar reciprocable relative to said guard plate, and tensioning means for maintaining said knife bar in operative relation to said guard plate, said guard plate, knife bar and tensioning means being removable as a unit from said support, a driving connection between said motor and cutting mechanism including an oscillatable shaft mounted in said frame, oscillating arms at opposite ends of said shaft, a yoke element carried by one of said oscillating arms adapted freely to embrace a cam driven by the motor, and a pivotal block carried by the other oscillating shaft, said knife bar including means comprising a guideway in which said pivotal block seats, being freely slidable therein and being freely removable therefrom including means on said knife bar having a guide-way, and an oscillating arm having a pivotal block seated in said guide-way freely slidable therein and freely removable therefrom.

SAMUEL C. AMOSS.